Figure 1:
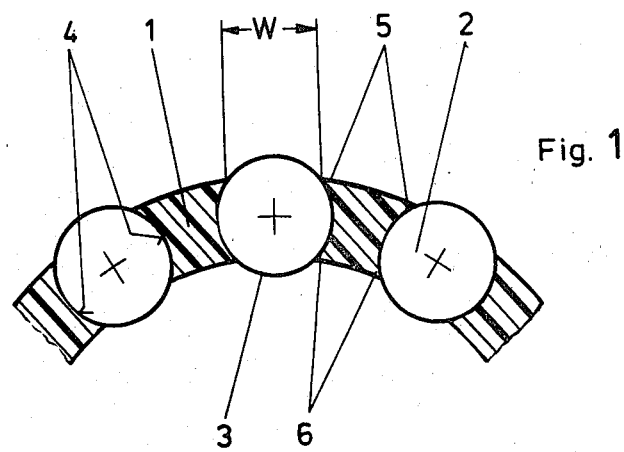

United States Patent [19]
Olschewski et al.

[11] 4,362,687
[45] Dec. 7, 1982

[54] METHOD AND APPARATUS FOR CASTING OR INJECTION-MOLDING OF CAGES OF CYLINDRICAL ROLLING ELEMENTS

[75] Inventors: Armin Olschewski, Schweinfurt; Manfred Brandenstein, Eussenheim; Lothar Walter; Heinrich Kunkel, both of Schweinfurt; Herbert Dobhan, Bergrheinfeld; Peter Horling, Mainberg; Norbert Klüpfel, Hambach, all of Fed. Rep. of Germany

[73] Assignee: SKF Kugellagerfabriken GmbH, Schweinfurt, Fed. Rep. of Germany

[21] Appl. No.: 210,217

[22] Filed: Nov. 25, 1980

[30] Foreign Application Priority Data

Dec. 7, 1979 [DE] Fed. Rep. of Germany ....... 2949251

[51] Int. Cl.$^3$ .............................................. B29C 7/00
[52] U.S. Cl. ................... 264/318; 264/334; 425/438
[58] Field of Search ...................... 425/438, DIG. 58; 249/60; 264/318, 334, 336

[56] References Cited

U.S. PATENT DOCUMENTS 386,219 7/1888 Price ...................................... 249/60
4,090,687 5/1978 Langhammer ........................ 249/60

FOREIGN PATENT DOCUMENTS 2704734 9/1977 Fed. Rep. of Germany ........ 249/60

*Primary Examiner*—Thomas P. Pavelko
*Attorney, Agent, or Firm*—Daniel M. Rosen

[57] ABSTRACT

In a method and apparatus for casting or molding cages for rolling elements, two slides are provided for each pocket. The slides have an engaging, inclined surface, and are shaped to permit one of the slides to be removed by initially sliding it along the inclined surface. The other slide may thereby be moved laterally in the formed pocket, and withdrawn from the pocket. Facing slides of adjacent pockets may be joined together, with limited movement possible therein, to form a complete ring serving as a mold member.

6 Claims, 3 Drawing Figures

METHOD AND APPARATUS FOR CASTING OR INJECTION-MOLDING OF CAGES OF CYLINDRICAL ROLLING ELEMENTS

This invention relates to a method and apparatus for casting or injection-molding cages for cylindrical rolling elements. Such cages have retaining projections for the rolling elements. These projections extend both inside and outside the cage along the lateral surfaces of the webs which extend between the pockets thereby. The invention employs two mold slides or cores for each pocket. The slides are retractable from the pockets and support one another along an inclined partition edge when they are in the pockets. The lateral surfaces of the slides have shapes that are equivalent to the shapes of the lateral surfaces of the webs, i.e., within the pockets of the cage.

It is necessary in cages, particularly in the case of cages for cylindrical rolling elements, that retaining projections be provided for perfect radial inward and outward retention of the rolling elements. The projections must be provided, both in the bore and on the periphery of the cage, in the area of the webs that define circumferential sides of the pockets. The projections thus protrude into the pockets. Since the clear width of a pocket, in the reagion of the retaining projection, is smaller than the clear width in the region of the thickest point of the rolling element, the manufacture of such cages from materials that may be cast or injection molded can only be effected by means of sectional slides or cores.

In a known method and apparatus for manufacturing such a cage, a slide is divided, for instance, into three parts, in a circumferential direction. The outermost slides, in a circumferential direction, are provided with external surfaces which follow the contour of the lateral surfaces of the webs, and their internal surfaces are inclined to accommodate the third slide between them. The third slide also has inclined lateral surfaces. After the injection molding or casting of the cage, initially the inner, wedge shaped, slide is retracted radially outwards (or inwards), whereupon the outer slides are moved toward one another in a circumferential direction, and are then also retracted radially outward or inward. Such an arrangement is disclosed in DE-OS No. 1,575,532.

This known method and apparatus has the disadvantage that many slides are needed for each pocket, and that the surfaces of the slides that contact other slides, and the guide surfaces for these slides, must be produced with extreme accuracy. Furthermore, this known method and apparatus may not be used for the manufacture of cages for the relatively thin rolling elements, because the slides then must be so thin walled, that the required stiffness and precision cannot be achieved. Also, the waste resulting from the use of this large number of slides is very great, so that only a limited number of cages having the required precision can be produced.

A method and apparatus are also known in which only two slides are required for each pocket. Here, one slide is pushed by means of resilient elements against the other of the slides, which is mounted in an inclined position. In this arrangement the angle of inclination is precisely equivalent to the angle of inclination of the retaining projections. After the injection-molding or casting, the slide that is arranged in an inclined position is pulled out obliquely outwards, whereby the other slide flips over to the outside, because of the spring-action, and is thus swung out of the cage pocket. This is disclosed in DE-OS No. 1,729,327. This design may only be used for cages in which the width of the pockets (in a circumferential direction) is greater than the radial height of the pocket, since otherwise the second slide cannot be swung out.

It is therefore an object of the present invention to provide a method and apparatus for the manufacture of cages for the retention of rolling elements, from materials that may be cast or injection-molded, and which permits the use of relatively brittle materials. The invention also is directed to the forming of cages with well-shaped retaining projections, and wherein the apparatus has a minimum number of parts. The apparatus is sufficiently stable, even for producing cages for small diameters rolling-elements and has a long life without premature wear of the parts, which wear might impair the precision of the cages.

The method of the invention enables the retraction of the mold slides or collapsible cores that form the pockets, without an elastic or plastic deformation of the retaining projections occuring.

In accordance with the invention, an apparatus is provided in which, after the casting or injection-molding of the cage, one mold slide of a pocket at a time can be retracted outward, obliquely along the partition surface, until it reaches a point at which that surface of the slide forming the farthest protruding lateral surface of the web leaves the overlap region of the retaining projection. Thereafter this slide is retracted radially further out of the pocket. Simultaneously or subsequently thereto, the other slide may be retracted along the corresponding retaining projection, e.g., by a translation movement transverse of the longitudinal axis of the pockets, or is also oblique. In this fashion, a distortion of the retaining projection is prevented upon removing from the mold, so that the cages may be manufactured for reliable operation even with small rolling-element diameters and out of relatively brittle material.

Figure 2:
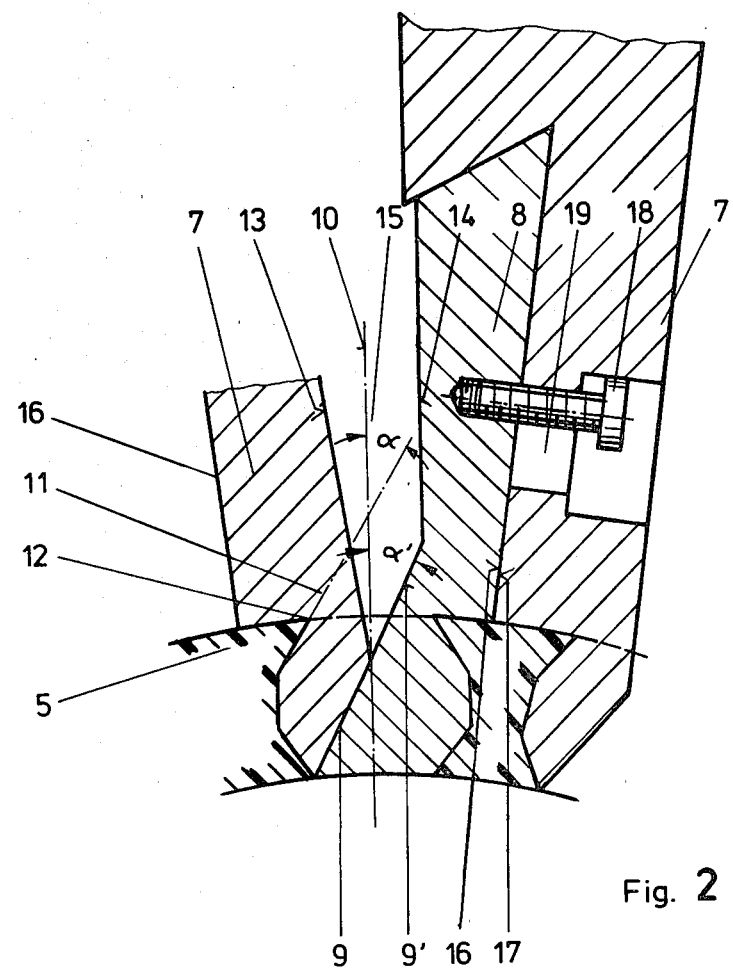
Figure 3:
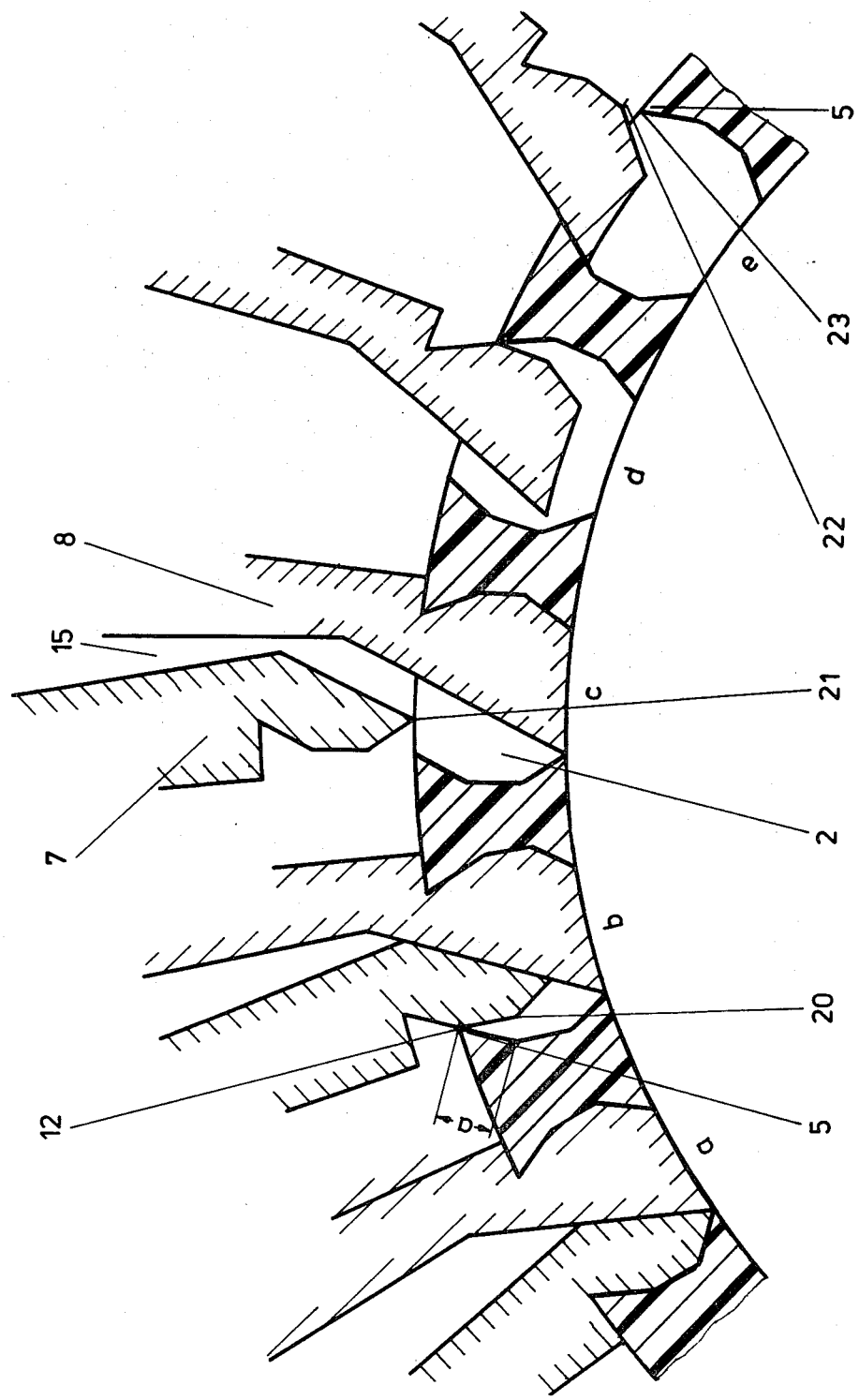

In order that the invention will be more clearly understood, it will now be disclosed in greater detail, with reference to the accompanying drawings, wherein:

FIG. 1 a partial cross-section of a cage for a radial rolling element bearing with cylindrical rolling elements;

FIG. 2 a partial cross-section of an apparatus for for the manufacture of the cage according to FIG. 1; and FIG. 3 shows the various stages of mold-removal of the mold slides or collapsible cores, wherein the various stages of the mold-removal are illustrated in individual pockets, in a clockwise direction.

FIG. 1 is a partial cross-section of an annular cage having pockets 2 distributed about its circumference for receiving cylindrical rolling elements 3. The pockets 2 are separated in the circumferential direction by webs 1. In order to retain cylindrical rolling elements 3 in the pockets 2, the inside and outside surfaces 4 of the webs 1 are provided with retaining projections 5 and 6, which protrude into the pockets 2. These projections narrow the clear width of the pocket openings sufficiently that the rolling elements cannot fall out of the pockets, once they have been inserted. Due to the narrowing of the pockets 2 in the region of its inner and outer surfaces, the cage cannot be manufactured in a simple manner of material that can be cast or injection-molded, since the cores that form the pocket must be capable of being retracted without damaging or permanently distorting the retaining projections. This risk is particularly great when the cages are made of brittle material. When the cages are designed for relatively thin rolling elements, these retaining projections are necessarily relatively small, so that even a small distortion of the retaining projections does not provide the absolutely secure retention of the rolling elements.

The apparatus shown in FIG. 2 is provided for producing the cage according to FIG. 1. It has two mold cores or slides 7 and 8, for the formation of each pocket 2. The slides are in contact with one another in the region of pocket 2, along the partition surface 9. This partition surface 9 is inclined at an angle $\alpha'$ to the center plane 10 of the pocket 2, i.e., the plane which passes through the center of the pocket and through the center axis of the cage. The angle $\alpha'$ is greater than the angle $\alpha$ between tangent 11 to the tip 12 of the projections within the pocket, and the center plane 10 of the pocket 2. The partition surface 9 of slide 8 is longer, namely by at least the amount "a" (see FIG. 3), i.e., the base length of retaining projection 5, compared to the length of the other slide 7. The two facing lateral surfaces 13 and 14 of slides 7 and 8 respectively are set back with respect to one another, so that a free space 15 is provided between slides 7 and 8. Space 15 is provided for the retraction of slide 7 from pocket 2. Slides 7 and 8 of adjacent pockets support one another after insertion, along their outer lateral surfaces 17 and 16 respectively, such that a closed "ring" is produced. This ring thereby fixes the precise position of the slides, without requiring any special additional guide surfaces or similar devices for that purpose.

The facing slides 7 and 8 of adjacent pockets are inter-connected by a bolt 18, which extends through elongated hole 19 in one of the slides. Upon retracting slide 7 through a distance determined by the dimensions of elongated hole 19, the slide 8 coupled thereto is carried along with the slide 7 in an outward direction. In order to enable slide 7 to pass the projection 5 of the pocket without any deformation of the projection 5, the limiting edge 7 of the bolt 18 is designed as illustrated to have play in relation to the corresponding lateral surface of the respective elongated hole 19.

After casting or injection-molding the cage, initially each slide 7 is retracted obliquely outward, along partition surface 9, until its anterior edge 20 reaches a point that is radially underneath the most external point 12 of retaining projection 5, as shown at (b) in FIG. 3. In order to negotiate this "undercut", partition surface 9 and mold slide 8 must be longer by at least the base length "a" of retaining projection 5, compared to the corresponding surface on slide 7. Slide 7 is now retracted outwardly directly in a radial direction, until its lower edge 21 reaches a point outside of pocket 2, as shown at (c) in FIG. 3. The space 15 between the slides 7 and 8 is required for this purpose. Next, slide 8 is slid laterally or obliquely in the pocket, until its anterior edge 22 reaches a point radially underneath the outermost point 23 of retaining projection 5 on the right side of the pocket, as seen at (e) in FIG. 3. Next, slide 8 is also retracted outward in a radial direction, for example to the position shown at (e) in FIG. 3, or completely out of the pocket if the dimensions of the slide permit this. In the arrangement shown in (e) of FIG. 3, of course, a further oblique withdrawal may be employed, whereupon the finished cage is ejected. The bolt 18 and hole 19 are dimensioned to permit all of the above steps without removal of the bolts.

As a modification of the sequence described, after the slide 7 is retracted obliquely, the retraction of slide 8 may be started, while the former slide continues its retraction.

Although the apparatus described above is designed for the manufacture of cages for radial bearings, it is also possible to provide, on the same basis, an apparatus for the manufacture of cages for axial bearings as well as linearly moveable bearings.

What is claimed is:

1. In a method for casting or injection-molding cages for retaining cylindrical rolling elements by cage projections, the projections being provided on both the inside and outside of the cage along the lateral surfaces of the webs located between the cage pockets, the method using two mold slides per pocket, the slides being retractable from the pockets and, when in the inserted position, engaging one another along a partition edge inclined to the radial direction of the cage, the slides having lateral surfaces facing away from one another that have shapes equivalent to the shape of the corresponding lateral surfaces of the webs; the improvement wherein, after the cage has been cast or injection-molded, first one slide is pushed out in a slanted direction along the partition edge, until the retaining projection formed by this slide is free, whereupon this slide is further retracted from the cage, in a radial direction; and in that, simultaneously or subsequently, the second slide is retracted from the pocket.

2. In a method for casting or injection molding an annular cage having radially extending pockets therethrough with circumferential directed projections at their radial inner and outer edges for retaining cylindrical rolling elements in said pockets, each said pocket being formed by a first and second mold slide, the mold slides having oppositely directed faces for forming opposite slides of the respective pockets and having planar abutting surfaces inclined to the radial direction of the cage when in the casting or molding position, the planar abutting surface of the second mold slide decreasing its circumferential width radially outwardly; the improvement in removing the mold slides following casting or molding, comprising first moving said first slide radially outwardly to slide along the inclined planar abutting surface of the second slide until it no longer lies radially under the radially outer projection of the corresponding side of the pocket, then secondly moving the first slide outwardly in the radial direction until it is positioned outside of the respective pocket, and simultaneously or following said second moving step, moving said second slide radially outwardly from said pocket.

3. The method of claim 2 wherein said step of moving said second slide is effected subsequent said second step of moving said first slide, said step of moving said second slide comprising initially moving said second slide obliquely in the respective pocket until its forming face no longer lies radially under the radially outer projection of the respective pocket, and finally removing said second slide from said pocket.

4. The method of claim 3 wherein said final step comprises moving said second slide radially outwardly.

5. The method of claim 3 wherein, in said initial step of moving said second slide, said second slide is moved to abut the opposite side of the pocket with its inclined planar surface, and said final step comprises moving said second slide out of said pocket obliquely along the then abutting side surface of the respective pocket.

6. The method of claim 2 wherein said step of moving said second slide comprises moving said second slide by way of a loose mechanical interconnection with said first slide.

* * * * *